US008559606B2

(12) United States Patent
Sana et al.

(10) Patent No.: US 8,559,606 B2
(45) Date of Patent: Oct. 15, 2013

(54) MULTIMODAL TELEPHONE CALLS

(75) Inventors: Bernardo S. P. Sana, Redmond, WA (US); Mini M. Varkey, Redmond, WA (US); Diego H. Carlomagno, Redmomd, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 12/962,003

(22) Filed: Dec. 7, 2010

(65) Prior Publication Data
US 2012/0140908 A1 Jun. 7, 2012

(51) Int. Cl.
*H04M 11/00* (2006.01)
(52) U.S. Cl.
USPC ........................................ 379/90.01; 370/352
(58) Field of Classification Search
USPC .......... 379/93.01, 90.01, 93.08, 93.17, 93.21; 455/414.1, 416; 370/352
See application file for complete search history.

(56) References Cited

U.S. PATENT DOCUMENTS

| | | | |
|---|---|---|---|
| 5,606,599 A | 2/1997 | O'Mahony | |
| 6,693,662 B1 | 2/2004 | Parker et al. | |
| 6,964,023 B2 | 11/2005 | Maes | |
| 7,289,606 B2 | 10/2007 | Sibal | |
| 7,450,934 B2 * | 11/2008 | Caspi et al. | 455/414.1 |
| 7,490,125 B1 | 2/2009 | Jagadeesan et al. | |
| 2003/0032410 A1 | 2/2003 | Saraswat | |
| 2004/0214555 A1 * | 10/2004 | Kumar et al. | 455/414.1 |
| 2006/0095556 A1 | 5/2006 | Arnold et al. | |
| 2007/0186108 A1 * | 8/2007 | Passarella et al. | 713/171 |
| 2008/0086562 A1 | 4/2008 | Etoh et al. | |
| 2008/0132218 A1 * | 6/2008 | Samson et al. | 455/418 |
| 2009/0094531 A1 * | 4/2009 | Danieli et al. | 715/753 |
| 2009/0098862 A1 * | 4/2009 | Gailey et al. | 455/414.1 |
| 2009/0149158 A1 * | 6/2009 | Goldfarb et al. | 455/414.1 |
| 2009/0209239 A1 * | 8/2009 | Montesdeoca | 455/414.2 |
| 2010/0199320 A1 | 8/2010 | Ramanathan | |
| 2010/0202599 A1 * | 8/2010 | Hillis et al. | 379/93.21 |
| 2011/0158222 A1 * | 6/2011 | Kerr et al. | 455/414.1 |
| 2011/0286586 A1 * | 11/2011 | Saylor et al. | 379/88.13 |
| 2012/0021721 A1 * | 1/2012 | Reed et al. | 455/414.1 |

OTHER PUBLICATIONS

Comverse White Paper: "Multimodality: The Next Wave of Mobile Interaction" accessed at: http://stelzner.com/PDF/Comverse-MultiModality.pdf; accessed on Sep. 20, 2010, 9 pages.
Fabbrizio et al.; "A Speech Mashup Framework for Multimodal Mobile Services" © 2009, 8 pages.
Herrell, Elizabeth; "Enterprise Communications: The Next Decade", Mar. 9, 2010, 11 pages.

(Continued)

*Primary Examiner* — Stella Woo
(74) *Attorney, Agent, or Firm* — Merchant & Gould

(57) ABSTRACT

A method for establishing a multimodal telephone call is provided. On a first computing device, a telephone call is received from a second computing device. On the first computing device, a response is sent to the second computing device that a telephony session is established between the first computing device and the second computing device. On the first computing device, a request message is sent to register the first computing device for a data session at an online registry service. On the first computing device, a response message is received indicating that the first computing device is registered at the online registry service. The response message includes a key that uniquely identifies the data session. On the first computing device, the key is used to establish the data session with the second computing device.

20 Claims, 10 Drawing Sheets

(56) References Cited

OTHER PUBLICATIONS

Niklfeld et al.; "Mobile Multi-Modal Data Services for GPRS Phones and Beyond" accessed at: http://userver.ftw.at/~pucher/papers/niklfeldg_multimodalGPRS-icmi02.pdf; accessed on Sep. 20, 2010, 6 pages.

Rosenberg, Arthur; "The End User Perspective of Multi-Modal Unified Communications" published Sep. 8, 2010, 8 pages.

Sibal, Dr. Sandeep; "Multi-Modal Wireless Applications—Introducing Versatility in Communication" article in R-evolution Newsletter published Dec. 2004, 8 pages.

International Search Report and Written Opinion mailed Jul. 25, 2012 in International Application No. PCT/US2011/062169 filed Nov. 26, 2011.

* cited by examiner

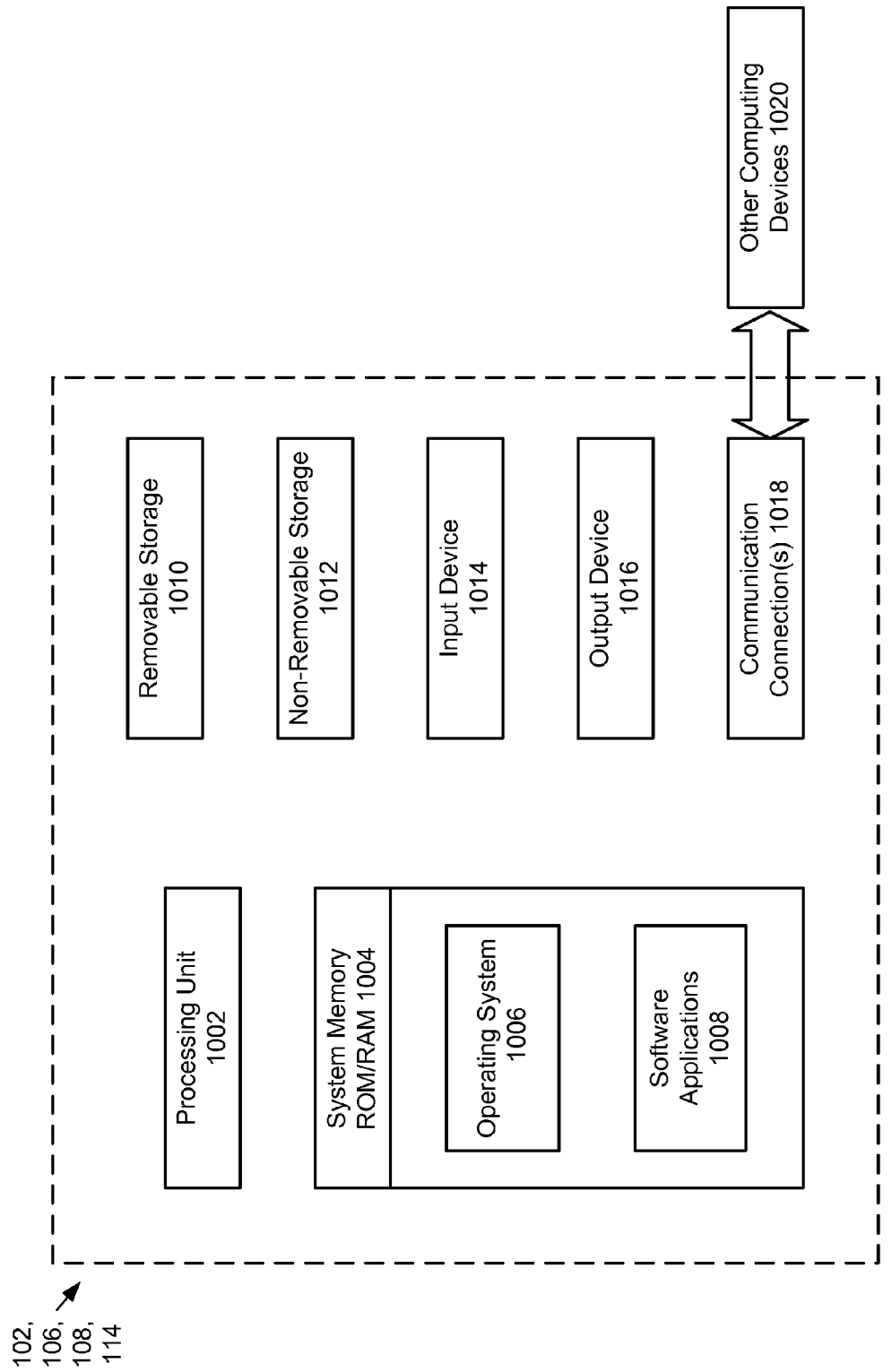

MULTIMODAL TELEPHONE CALLS

BACKGROUND

Smart telephones provide more computing and connectivity options than standard telephones. In addition to making telephone calls, smart telephones are typically used to access the Internet or corporate intranets. Applications such as email and web browsing are common on smart telephones.

Telephone calls between standard telephones are limited to voice communications. Although some smart telephones may include a computer operating system, telephone calls between smart telephones are also typically limited to voice communications. When a data exchange is desired between connecting parties, a separate data channel using separate equipment is typically required.

SUMMARY

Embodiments of the disclosure are directed to a method implemented on a computing device for establishing a multimodal telephone call. On the first computing device, a telephone call is received from a second computing device. A telephony session is established between the first computing device and the second computing device. On the first computing device, a request message is sent to register the first computing device for a data session at an online registry service. On the first computing device, a response message is received indicating that the first computing device is registered at the online registry service. The response message includes a key that uniquely identifies the data session. On the first computing device, the key is used to establish the data session with the second computing device.

The details of one or more techniques are set forth in the accompanying drawings and the description below. Other features, objects, and advantages of these techniques will be apparent from the description, drawings, and claims.

DESCRIPTION OF THE DRAWINGS

FIG. 10 shows example components of the computing devices of FIG. 1.

DETAILED DESCRIPTION

The present application is directed to systems and methods for using a multimodal capability of smart telephones to exchange both voice and data in the context of a telephone call. The telephone call is initiated as a voice communication but migrates to include a data connection when both parties in the telephone call determine that multimodal capability is available.

The term multimodal, as used herein, refers to the ability of a device to support both voice and data communications.

When a caller initiates a telephone call to a recipient from a computing device a smart telephone with multimodal capability, the caller's computing device also sends a data session registration request to an online registry service. The online registry service is typically a server computer that provides hosting capability and that also provides a data session registry service. When the recipient receives the telephone call, if the recipient's telephone is also a computing device with multimodal capability and if the computing device is properly configured, the recipient's computing device also sends a data session registration request to the online registry service. In examples, the computing devices may be smart telephones, laptop/desktop computers, unified messaging servers, etc.

The data session registration request from computing device of both the caller and the recipient includes the telephone number of both the caller and the recipient. When the online registry service receives the data session registration requests, the online registry service attempts to match the caller and recipient telephone numbers in both registration requests. When the online registry service determines that the caller and recipient telephone numbers in the registration requests match, the online registry service establishes a data session between the caller and the recipient. When the data session is established, a simultaneous voice and data connection exists between the caller and the recipient. Once the voice and data connection is established, rich content can be exchanged between the computing devices of the caller and the recipient via the online registry service.

Figure 1:
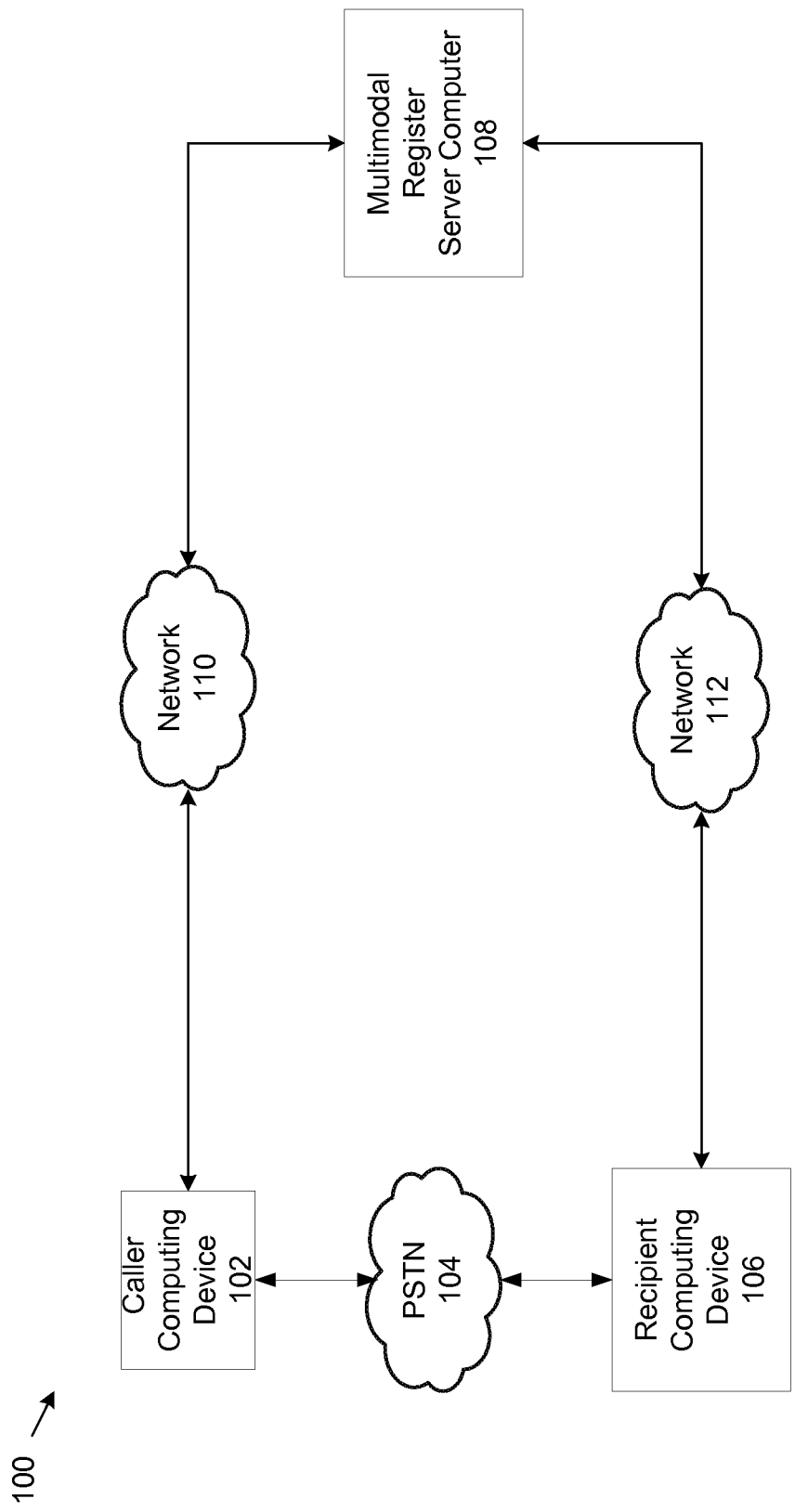
FIG. 1 shows an example system that supports establishment of a multimodal telephone call.

FIG. 1 shows an example system 100 that supports the establishment of a multimodal telephone call. The example system 100 includes an example caller computing device 102, an example recipient computing device 106, a public switched telephone network (PSTN) 104, an example multimodal register server computer 108 and networks 110 and 112.

The caller computing device 102 and the recipient computing device 106 are smart telephones with multimodal capability. The multimodal register server computer 108 is a server computer is a hosted service that provides an online registry service. For example, a multimodal register server can be built using the Windows Azure™ cloud services operating system from Microsoft Corporation of Redmond, Wash. One example of recipient computing device 106 is the Microsoft Exchange Server 2010 server computer with unified messaging. The Microsoft Exchange Server 2010 server computer provides auto attendant hosting capability.

In the example system 100, communication between the caller computing device 102 and the multimodal register server computer 108 occurs across network 110 and communication between the recipient computing device 106 and the multimodal register server computer 108 occurs across network 112. In examples, networks 110 and 112 are a corporate Intranet or the Internet. In some examples, network 110 and network 112 are the same network.

When a caller at caller computing device 102 initiates a telephone call to recipient computing device 106, the caller computing device 102 also sends a first registration request for the establishment of a data session to multimodal register server computer 108. At the time the caller computing device 102 sends the first registration request, the caller computing device 102 has no knowledge about the multimodal capabilities of the recipient computing device 106. However, the request is sent as a matter of protocol to provide caller registration information for the possibility that the recipient computing device 106 does have multimodal capability. The call is made over the PSTN 104. When the recipient computing device 106 receives the telephone call, a voice communication telephony session is established between the caller computing device 102 and the recipient computing device 106.

When the recipient computing device 106 has multimodal capability, the recipient computing device 106 may be configured to initiate a registration request for a data session with the caller computing device 102. For example, the recipient computing device 106 may include an automated attendant that automatically initiates a second registration request for a data session when an incoming call is received. As with the caller computing device 102, the recipient computing device 106 has no knowledge of the multimodal capability of the caller computing device 102. However, the second registration request is initiated by the recipient computing device 106 as a matter of protocol to provide registration information for the possibility that caller computing device 102 does have multimodal capability.

The first registration request from caller computing device 102 and the second registration request from recipient computing device 106 each include the caller computing device 102 telephone number and the recipient computing device 106 telephone number. When the multimodal register server computer 108 receives the second registration request, the multimodal register server computer 108 attempts to match the caller computing device telephone number 102 and the recipient computing device 106 telephone number with caller and recipient telephone numbers from other registration requests received at the multimodal register server computer 108.

When the multimodal register server computer 108 determines that the caller computing device 102 telephone number and the recipient computing device telephone number 106 from the first registration request matches the caller computing device telephone number 102 and the recipient computing device 106 telephone number from the second registration request, the multimodal register server computer 108 establishes a data connection between the caller computing device 102 and the recipient computing device 106. When the data connection is established, data can be transferred between the caller computing device 102 and the recipient computing device 106 using standard network protocols.

The ability to establish a multimodal conversation between two parties in which both voice and data are exchanged provides several possible application scenarios. Generally, as described herein, the establishment of a multimodal conversation allows for the exchange of rich communications between the two parties.

In one example, a caller using a smart telephone calls a pizza store to place an order for pizza. The pizza store could have an automated attendant hosted on the recipient computing device 106. Because the pizza store had configured one of the automated attendants to display specials for the day when calls are received from multimodal devices such as smart telephones, when a telephone session is established between the caller and the pizza store and when a data session is established between the caller and the pizza store, when the caller calls the pizza store, the specials of the day are displayed on the caller's smart phone at the same time that the caller is talking to an employee of the pizza store and placing an order.

In a second example, a caller telephones a restaurant to obtain driving directions to the restaurant. Because the caller uses a smart telephone, the smart telephone, for example the caller computing device 102 also sends a request to an online registry service, for example multimodal register server computer 108, to register for a data session. An automated attendant registered for the restaurant answers the telephone call and provides a voice menu of options for the caller. For example, the automated attendant may be hosted in the recipient computing device 106. One of the voice options in the menu is "directions." When the caller says "directions," the automated attendant at the restaurant sends the caller a map that the caller can visualize via the data connection between the caller computing device 102 and recipient computing device 106 via the online registry service.

In a third example, an extension of the second example above, the caller places an order over the phone. When the order is placed, the restaurant attendant uses the data connection to display the order on the caller's smart telephone and asks the caller to confirm the order.

In a fourth example, a caller calls an employee at a business office. The employee is on vacation. Because the caller is calling from a smart telephone, as discussed the caller also initiates a data session with the business office. When the call is received at the business office, a message on the employee's phone informs the caller that the employee is out of the office. Because the business office uses a unified messaging server computer, the unified messaging server computer sends the caller the employee's calendar over the data connection and also sends the caller a list of contacts that the employee created before the employee left for vacation.

In a fifth example, a man is in the market for a sofa, but is undecided about two sofas. The man calls his wife, but the wife does not answer the telephone and the call is redirected to her voice mail system. Because the man is calling from a smart telephone and because the wife's voice mail system is hosted by a unified messaging server computer device, a data session is established between the man's smart telephone and the unified messaging server computer device. The man records a voice message and sends pictures of both sofas before ending the telephone call. When the wife checks her smart telephone, the wife listens to a message left by her husband. At the same time, the wife's smart telephone displays the two pictures of the sofa sent by her husband.

In a sixth example, a caller calls a department store to check on the status of an order. Because the caller calls from a smart telephone and because the department store uses an automated attendant hosted by a unified messaging server computer, in addition to a telephone session being established between the caller and the department store, a data session is also established between the caller and the department store. When the caller asks for the status of her order, the automated attendant displays the order status and other order information on the caller's smart telephone.

In a seventh example, the caller from the sixth example disagrees with something on her monthly billing statement from the department store. When the caller places a telephone call to the billing office of the department store, a data session is established between the caller and an automated attendant associated with the billing office. The automated attendant displays the caller's billing statement online while the caller waits for someone to answer the telephone call. When a customer representative answers the telephone call, both the caller and the customer representative are able to see the caller's billing statement. The caller is also able to highlight portions of the billing statement, making it easier for the customer service representative to understand to which portion of the bill the caller is referring.

The examples provided above are not exhaustive or limiting. Many applications of the technologies described herein are possible.

Figure 2:
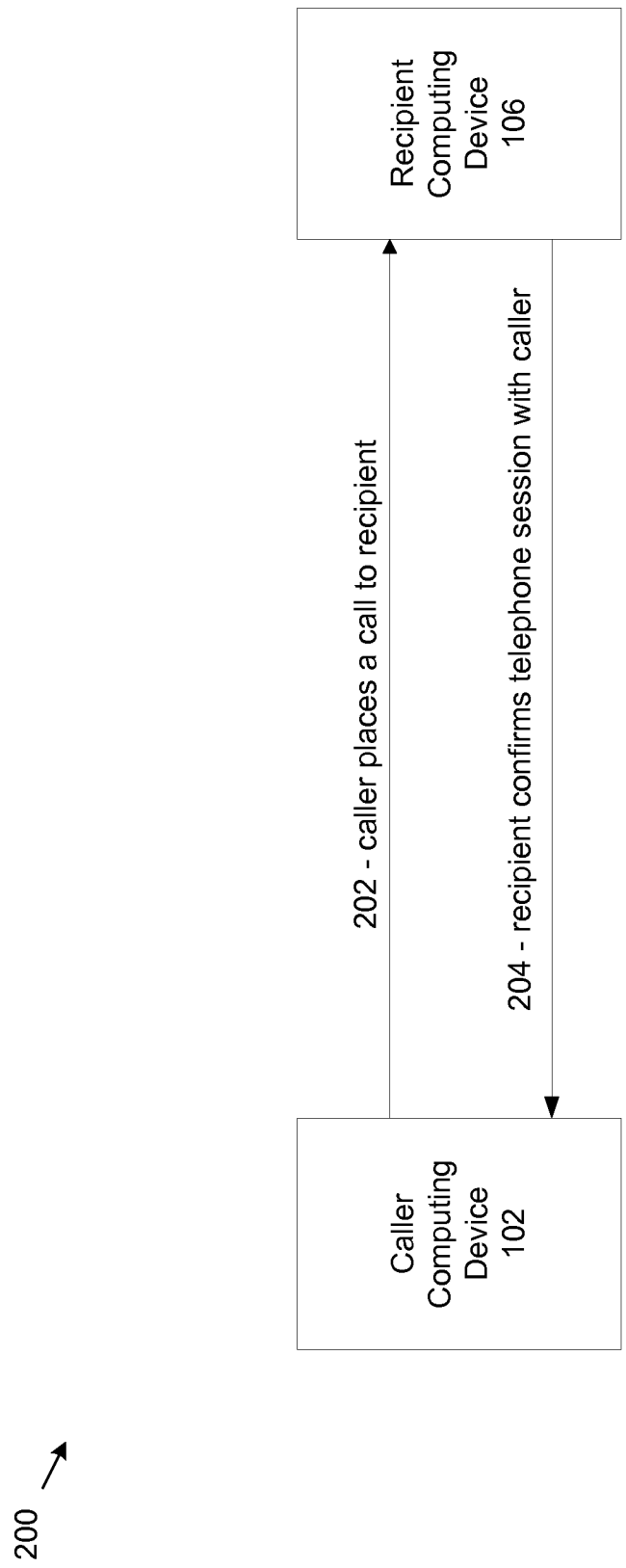
FIG. 2 shows example communications between a caller computing device and a recipient computing device of the system of FIG. 1 during the establishment of a multimodal telephone call.

Referring to FIGS. 2-5, the process of establishing a multimodal telephone call is described in more detail. FIG. 2 shows example communications 200 between the caller computing device 102 and the recipient computing device 106 during the establishment of a multimodal telephone call. At step 202, using a smart telephone, a caller at caller computing device 102 initiates a telephone call with a recipient computing device 106. The recipient computing device 106 is a computing device capable of handling multimodal telephone calls. For example, the recipient computing device 106 may be a smart telephone or a unified messaging server computer, etc. The telephone call is sent over a public switched telephone network, for example PSTN 104, not shown in FIG. 2. After the recipient computing device 106 receives the telephone call, the recipient computing device 106 confirms the establishment of the telephone call with the caller computing device 102.

Figure 3:
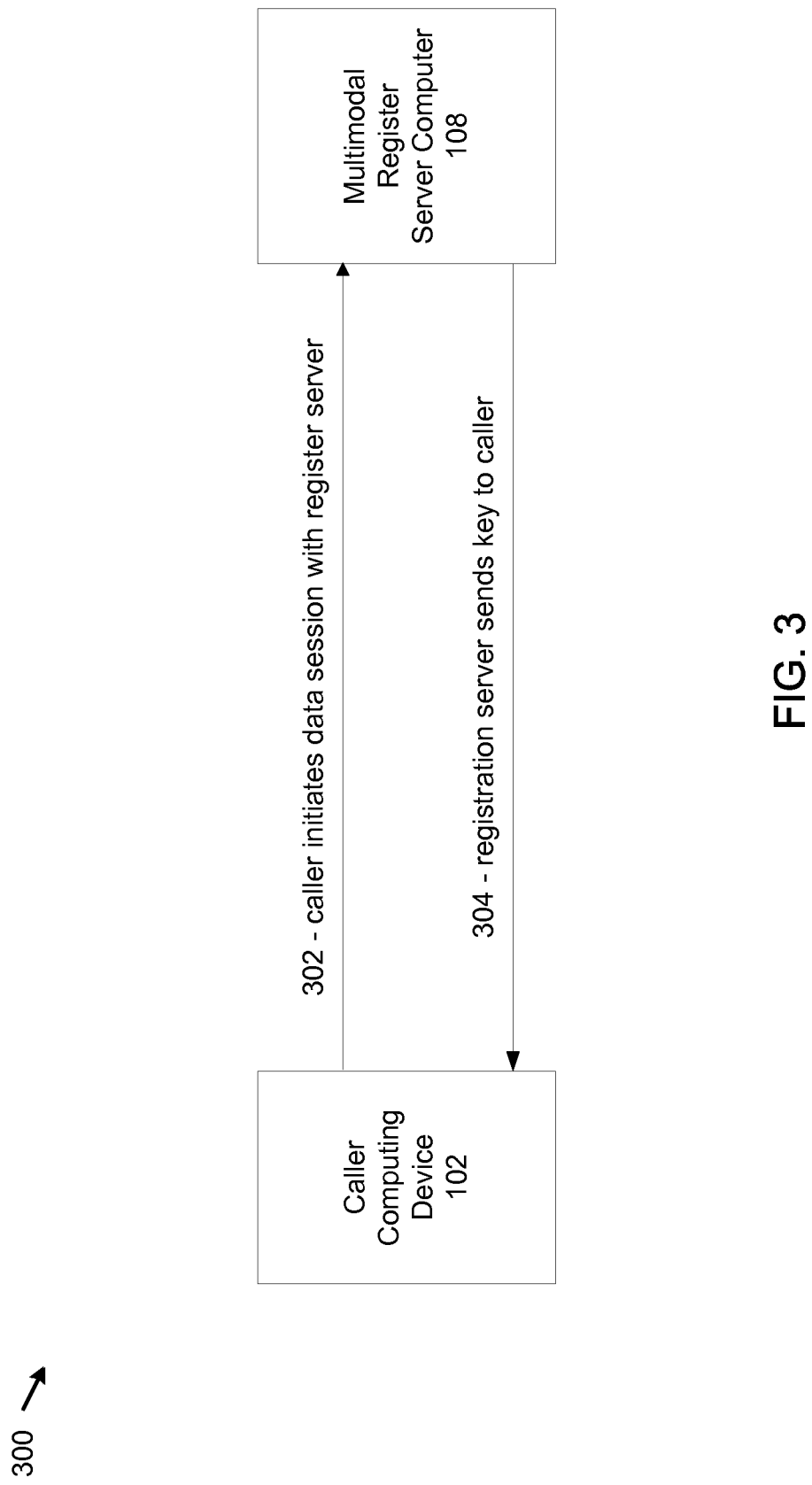
FIG. 3 shows example communications between the caller computing device and a multimodal register server computer of the system of FIG. 1 during the establishment of the multimodal telephone call.

FIG. 3 shows example communications 300 between the caller computing device 102 and the multimodal register server computer 108 when the caller computing device 102 registers with the multimodal register server computer 108 for a data connection. When the caller computing device 102 initiates a telephone call with the recipient computing device 106 (step 202), because the caller computing device 102 is a smart phone, at step 302, the caller computing device 102 also sends a request to the multimodal register server computer 108 to register with the multimodal register server computer 108 for a data connection. The request includes the telephone number of the caller (caller computing device 102) and the telephone number of the recipient (recipient computing device 106). The request also includes a fully qualified domain name for the multimodal register server computer 108. As discussed, the multimodal register server computer 108 is a hosted service that provides an online registry service, for example a registry service hosted on the Windows Azure™ cloud services operating system. In this disclose, the telephone number of the caller is represented as <CALLERNUMBER> and the telephone number of the recipient is represented as <RECIPIENTNUMBER>.

When the multimodal register server computer 108 establishes the data connection between the caller computing device 102 and the recipient computing device 106, at step 304, the multimodal register server computer 108 creates a key for the data connection and sends the key to the caller computing device 102. The key represents a unique identifier for the data session. The key may comprise one or more numbers or alphabetic characters.

Figure 4:
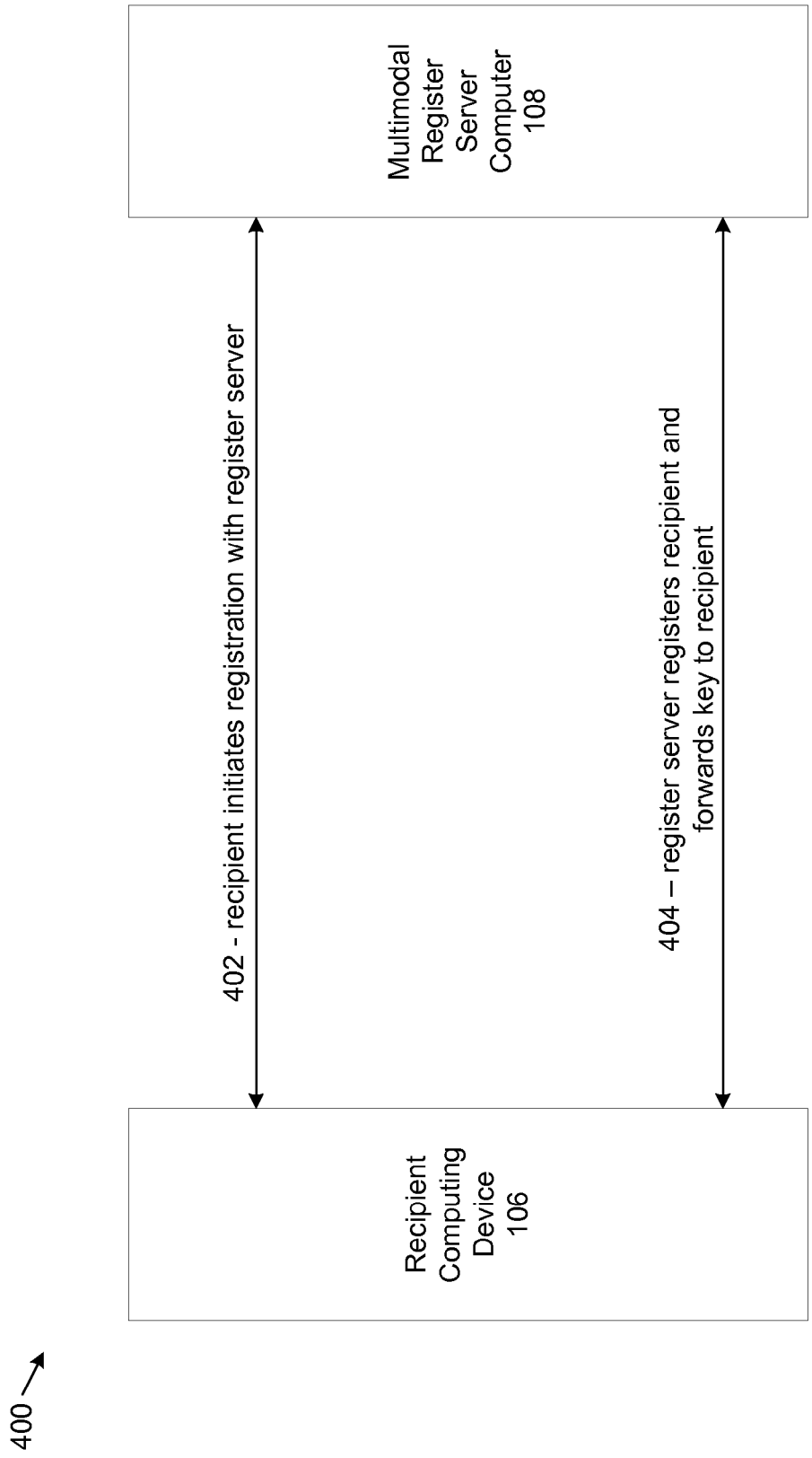
FIG. 4 shows example communications between the recipient computing device, a messaging email server computer and the multimodal register server computer of the system of FIG. 1 during the establishment of the multimodal telephone call.

FIG. 4 shows example communications 400 between the recipient computing device 106, and the multimodal register server computer 108 when the recipient computing device 106 registers with the multimodal register server computer 108 for a data connection. The recipient computing device 106 may be a unified messaging server that hosts an automated attendant or a voice mail system.

At step 402, the recipient computing device 106 initiates a registration process with the multimodal register server computer 108. The registration message from the recipient computing device 106 includes the telephone number of the caller computing device 102 (caller telephone number), the telephone number of the recipient computing device 106 (recipient telephone number) and the fully qualified domain name for the multimodal register server computer 108.

At step 404, the multimodal register server computer 108 establishes a data session with the recipient computing device 106 and sends the key for the data session to the recipient computing device 106.

The process of the multimodal register server computer 108 establishing a data session with the recipient computing device 106 involves determining whether the telephone number of the caller computing device 102 and the telephone number of the recipient computing device 106 that are included in the registration request message from the recipient computing device 106 matches a caller computing device number and a recipient computing device number already registered at the multimodal register server computer 108.

For example, at step 302, the multimodal register server computer 108 registers the caller computing device 102 and associates the telephone numbers of the caller computing device 102 and the recipient computing device 106 with the registration. In examples, the telephone numbers are stored in the multimodal register server computer 108 as a concatenated string with the following syntax:

<CALLERNUMBER><CALLEDNUMBER>

In other examples, a different format may be used. The caller number is the telephone number of the caller computing device 102, and the called number is the telephone number of the recipient computing device 106.

At step 404, the multimodal register server computer 108 registers the recipient computing device 106 and associates the telephone numbers of the caller computing device 102 and the recipient computing device 106 with the registration. The telephone numbers are stored in the multimodal register server computer 108 as a string with the following syntax:

<CALLERNUMBER><CALLEDNUMBER>

The caller number is the telephone number of the caller computing device 102, and the called number is the telephone number of the recipient computing device 106.

The multimodal register server computer 108 determines if a match is found between the strings. Some normalization of the strings may be required before the matching process. When a match is found between the strings, the multimodal register server computer 108 creates a temporary unique identifier for a data session with the caller computing device 102 and with the recipient computing device 106. The temporary unique identifier is also known as a key.

At step 404, the multimodal register server computer 108 registers the recipient computing device 106 for a data session and sends a response message with the key to the recipient computer device 106.

Figure 5:
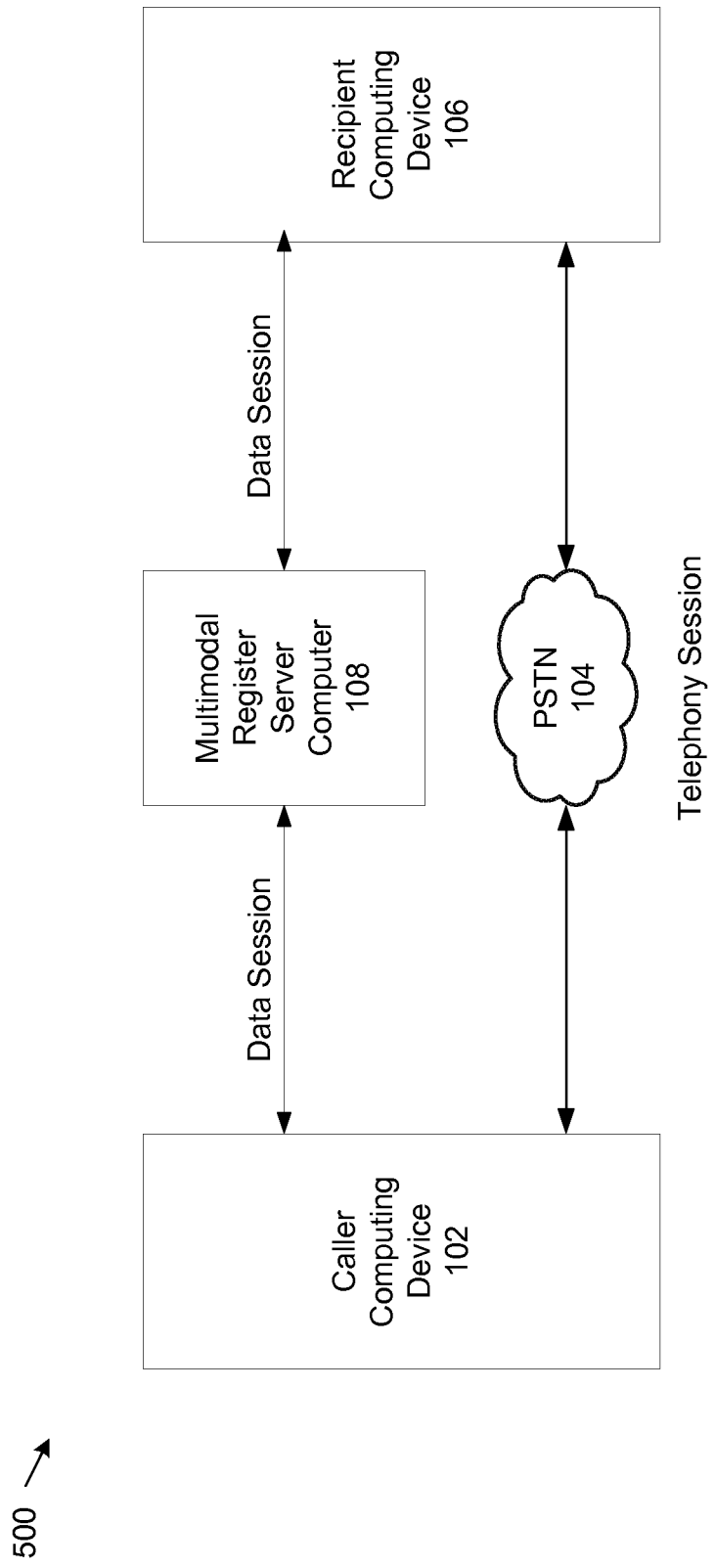
FIG. 5 shows an example system showing the establishment of a multimodal telephone call for the system of FIG. 1.

FIG. 5 shows an example system 500 showing both a telephony session and a data session that are established between the caller computing device 102 and the recipient computing device 106. A data session is established between the caller computing device 102 and the multimodal register server computer 108. In examples the caller computing device 102 uses the <REGISTERFQDN> and the <KEY>, where <REGISTERFQDN> is the fully qualified domain name for the multimodal register server computer 108 to send and receive messages via a network protocol, e.g., HTTP, SOAP. In other examples, a different format or protocols may be used.

A data session is also established between the recipient computing device 106 and the multimodal register server computer 108. In examples, the recipient computing device 106 uses the <REGISTERFQDN> and <KEY>, where <REGISTERFQDN> is the fully qualified domain name for the multimodal register server computer 108 and <KEY> to send and receive messages via a network protocol such as HTTP or SOAP. In other examples, different formats may be used for the fully qualified domain name and the key.

Once the data sessions are established between the caller computing device 102 and the multimodal register server computer 108 and between the recipient computing device 106 and the multimodal register server computer 108, data can be transmitted between the caller computing device 102 and the recipient computing device 106 using the multimodal register server computer 108 as an intermediary. FIG. 5 also shows that a telephony session coincides with the data session so that voice and data communications are simultaneously operative between the caller computing device 102 and the recipient computing device 106.

When the telephone call between the caller computing device 102 and the recipient computing device 106 is completed, for example when the parties in the telephone call hang up, the caller computing device 102 sends a message to the multimodal register server computer 108 terminating the data connection and identifying the key as no longer being valid When the multimodal register server computer 108 receives the termination message from the caller computing device 102, the multimodal register server computer 108 unregisters the caller computing device 102.

The recipient computing device 106 also sends a message to the multimodal register server computer 108 terminating the data connection and identifying the key as no longer being valid. When the multimodal register server computer 108 receives the termination message from the recipient computing device 106, the multimodal register server computer 108 unregisters the recipient computing device 106.

Figure 6:
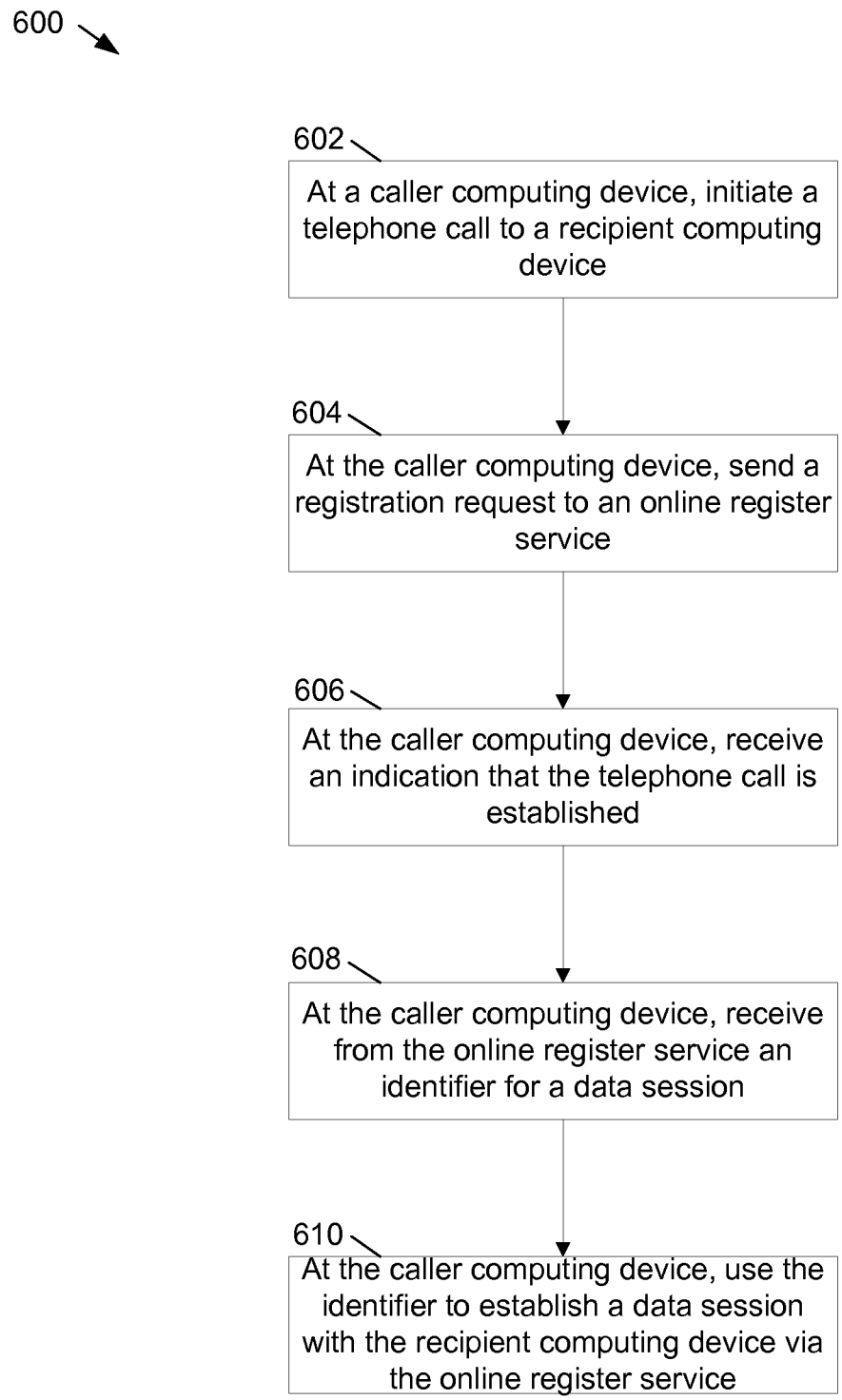
FIG. 6 shows an example flowchart for establishing a multimodal telephone call from the perspective of the calling computing device of FIG. 1.

FIG. 6 shows an example flowchart of a method 600 at a caller computing device for establishing a multimodal telephone call between the caller computing device, for example caller computing device 102, and a recipient computing device, for example recipient computing device 106. In some examples, the recipient computing device 106 is also a smart telephone. In other examples, the recipient computing device 106 is a client computer having multimodal capability.

At operation 602, a caller at the caller computing device 102 initiates a telephone call to a recipient computing device 106. At operation 604, the caller computing device 102 also sends a registration request to an online registry service, for example the multimodal register server computer 108. The online registry service is an online hosting server computer that also provides registration capability. The registration capability provides for registering a computing device for a data connection with one or more other computing devices.

When the caller at operation 602 initiates the telephone call to the recipient computing device 106, the caller computing device 102 has no knowledge as to whether the recipient computing device 106 can support a data connection. However, each time the caller computing device 102 initiates the telephone call to the recipient computing device 106 at operation 602, the caller computing device 102 also sends the registration request to the online registry service. When the recipient computing device 106 cannot support a data connection, no response is typically received for the registration request of operation 604.

At operation 606 a response is received from the recipient computing device indicating that a telephony session is established between the caller computing device and the recipient computing device.

At operation 608, a response message is received from the online registry service, for example from the multimodal register server computer 108. The response message indicates that the caller computing device 102 is registered at the multimodal register server computer 108 and that a data session has been established at the multimodal register server computer 108. The response message also includes a key for the data session. The key is a unique identifier for the data session that is created when a match is detected from registration information from the caller computing device and the recipient computing device. The registration information includes the telephone numbers of the caller computing device 102 and the recipient computing device 106.

At operation 610, the key is used to establish a data session between the caller computing device 102 and the recipient computing device 106. In examples, the data session may implement direct communication between the caller computing device 102 and the recipient computing device 106 or the data session may use the online registry service as an intermediary between the caller computing device 102 and the recipient computing device 106.

Figure 7:
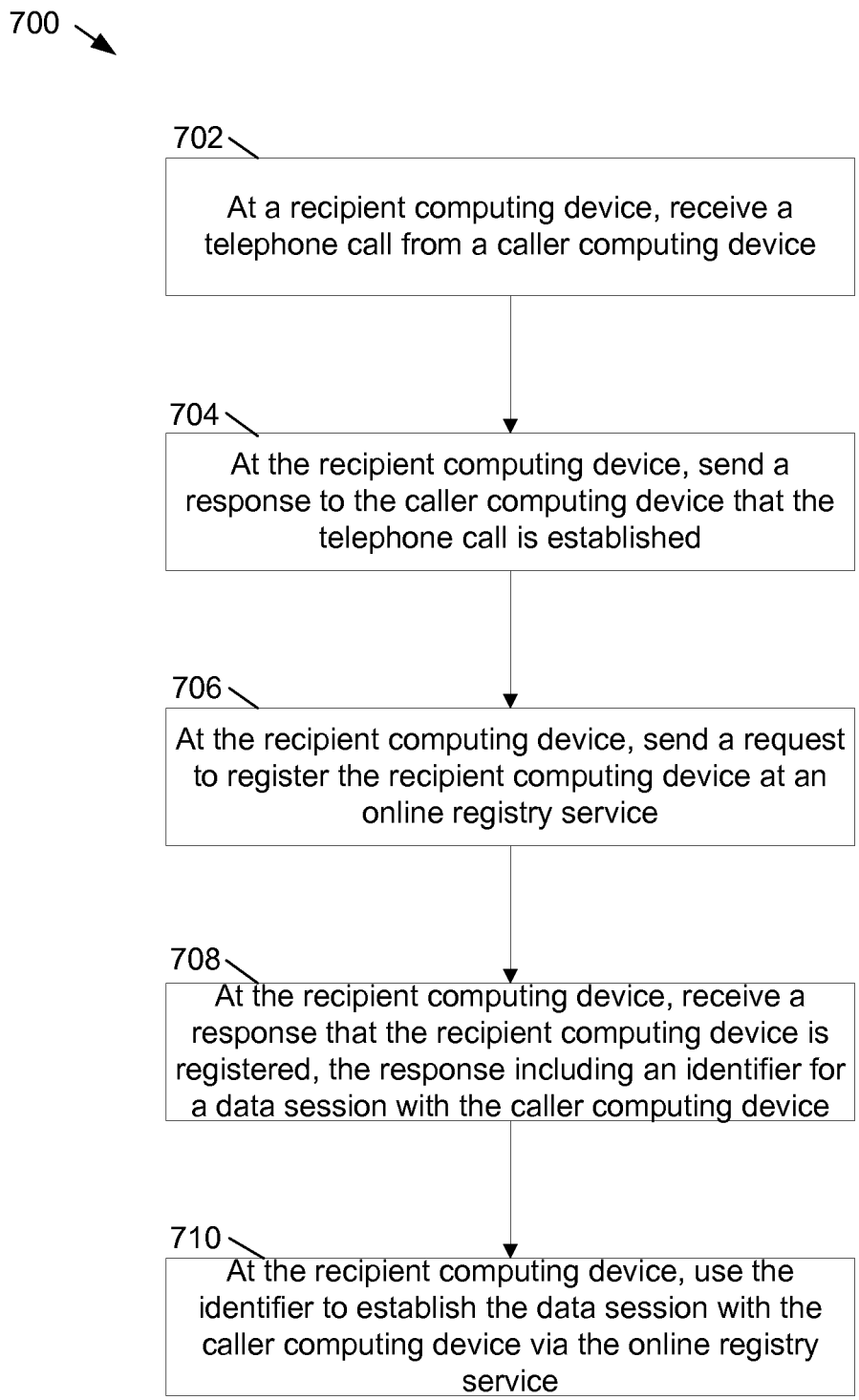
FIG. 7 shows an example flowchart for establishing a multimodal telephone call from the perspective of the recipient computing device of FIG. 1.

FIG. 7 shows an example flowchart of a method 700 at a recipient computing device, for example at recipient computing device 106, for establishing a multimodal telephone call with a caller computing device, for example caller computing device 102.

At operation 702, the recipient computing device 106 receives a telephone call from the caller computing device 102. At operation 704, the recipient computing device 106 sends a response to the caller computing device 102 indicating that a telephony session has been established between the caller computing device 102 and the recipient computing device 106.

At operation 706, the recipient computing device 106 sends a registration request to an online registry service. The online registry service, for example the multimodal register server computer 108, is an online hosted service that also provides registration capability. The registration capability provides for registering a computing device for a data connection with one or more other computing devices.

When the recipient computing device 106 receives the telephone call, the recipient computing device 106 has no knowledge as to whether the caller computing device 102 can support a data connection. However, each time the recipient computing device 106 receives a telephone call, the recipient computing device 106 sends a registration request to the online registry service. When the caller computing device 102 cannot support a data connection, no response is typically received for the registration request of operation 706.

At operation 708, a response message is received at the recipient computing device 106 indicating that the recipient computing device 106 is registered for a data session at the online registry service. The response also includes a key for the data session. The key is a unique identifier for the data session that is created when a match is detected from registration information from the caller computing device 102 and the recipient computing device 106. The registration information includes the telephone numbers of the caller computing device 102 and the recipient computing device 106.

At operation 710, the key is used to establish a data session between the caller computing device 102 and the recipient computing device 106. The recipient computing device 106 sends and receives messages using the <REGISTERFQDN> and KEY, where REGISTERFQDN is the fully qualified domain name of the multimodal register server computer 108 and where KEY is the unique identifier for the data session.

The data is exchange via a network protocol, such as HTTP or SOAP.

Figure 8:
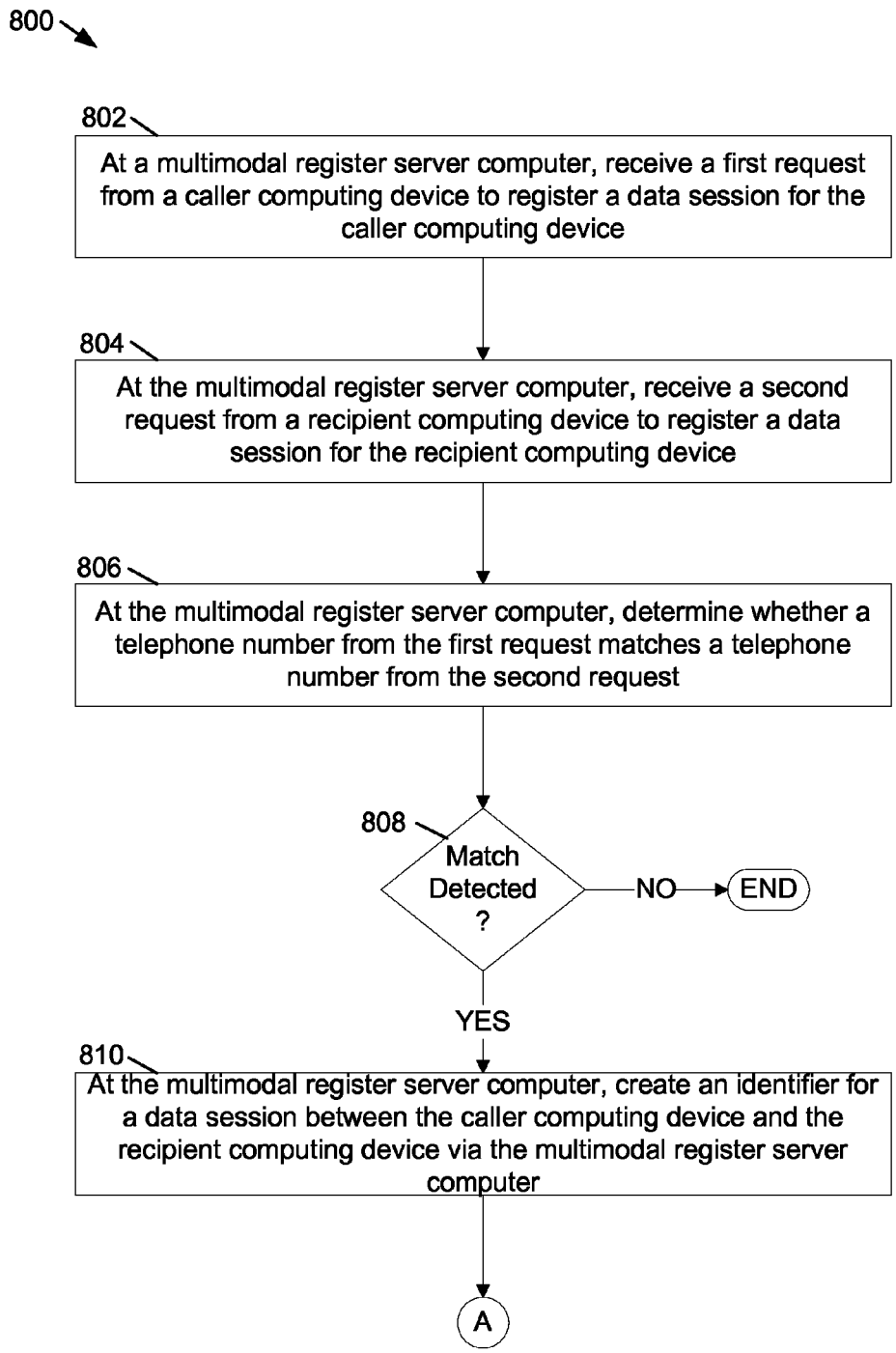
FIGS. 8 and 9 show an example flowchart for establishing a multimodal telephone call from the perspective of the multimodal register server computer of FIG. 1.
Figure 9:
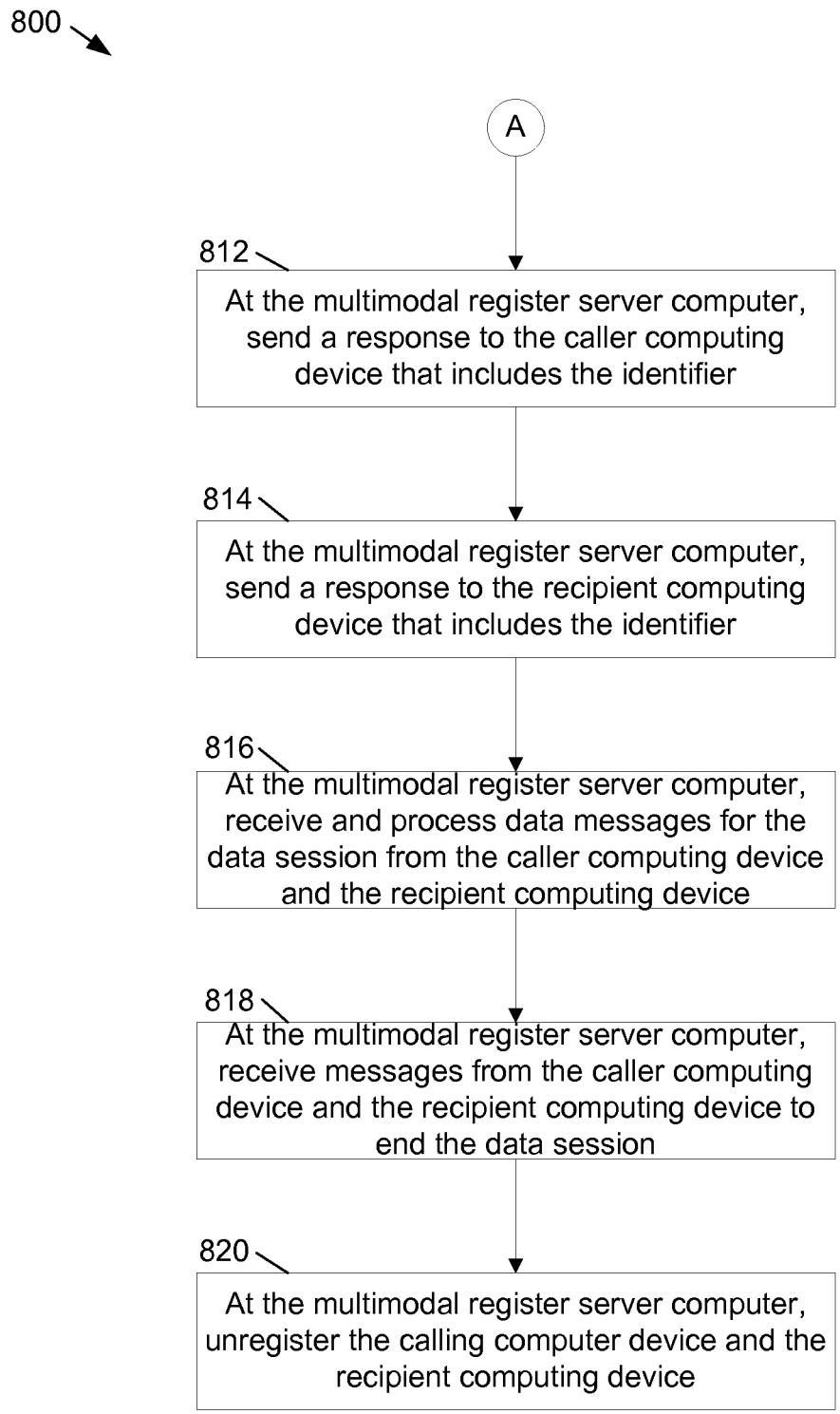

FIGS. 8 and 9 show an example flowchart of a method 800 for a registering a caller computing device and a recipient computing device for a data session at an online registry service. In this example, the caller computing device is caller computing device 102, the recipient computing device is recipient computing device 106 and the online registry service is the multimodal register server computer 108.

At operation 802, a first request message is received at the multimodal register server computer 108 from the caller computing device 102 to register a data session for the caller computing device 102. At operation 804, a second request message is received at the multimodal register server computer 108 from the recipient computing device 106. At operation 806, the multimodal register server computer 108 determines whether a telephone number information in the first request message matches a telephone number information in the second request.

At operation 808, a determination is made as to whether a match is detected. When a determination is made that a match is detected, meaning that the telephone information provided by both the caller and the recipient computer device match, at operation 810 an identifier is created for a data session between the caller computing device 102 and the recipient computing device 106. The identifier, also known as a key, provides a unique identifier for the data session.

At operation 812, the multimodal register server computer 108 sends a response message to the caller computing device 102. The response message also includes the key for a data session.

At operation 814, the multimodal register server computer 108 sends a response message to the recipient computing device 106. The response message to the recipient computing device 106 also includes the key for the data session. The data session setup at the multimodal register server computer 108 permits data communication between the caller computing device 102 and the recipient computing device 106.

At operation 818, the multimodal register server computer 108 receives a message from one or both of the caller computing device 102 and the recipient computing device 106 indicating that the telephone call between the caller computing device 102 and the recipient computing device 106 has ended. At operation 820, the multimodal register server computer 108 unregisters the caller computing device 102 and the recipient computing device 106.

With reference to FIG. 10, example components of computing devices 102, 106 and server computers 108, 114 are shown. In example embodiments, computing devices 102, 106 are client computers. In example embodiments, the server computers 108, 114 are computing devices. The recipient computing device 106 can include input/output devices, a central processing unit ("CPU"), a data storage device, and a network device. The other computing device 102 and the server computers 108, 114 can be configured in a similar manner.

In a basic configuration, the recipient computing device 106 typically includes at least one processing unit 1002 and system memory 1004. Depending on the exact configuration and type of computing device, the system memory 1004 may be volatile (such as RAM), non-volatile (such as ROM, flash memory, etc.) or some combination of the two. System memory 1004 typically includes an operating system 1006 suitable for controlling the operation of a networked personal computer, such as the Windows® operating systems from Microsoft Corporation of Redmond, Wash. or a server, such as Microsoft Exchange Server 2010, also from Microsoft Corporation of Redmond, Wash. The system memory 1004 may also include one or more software applications 1008 and may include program data.

The recipient computing device 106 may have additional features or functionality. For example, the recipient computing device 106 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 10 by removable storage 1010 and non-removable storage 1012. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by recipient computing device 106. Any such computer readable storage media may be part of the recipient computing device 106. Caller computing device 102 may also have input device(s) 1014 such as keyboard, mouse, pen, voice input device, touch input device, etc. Output device(s) 1016 such as a display, speakers, printer, etc. may also be included.

The recipient computing device 106 may also contain communication connections 1018 that allow the device to communicate with other computing devices 1020, such as over a network in a distributed computing environment, for example, an intranet or the Internet. Communication connections 1018 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method implemented on a first computing device for establishing a multimodal telephone call, the method comprising:
   on the first computing device, receiving a telephone call from a second computing device;
   on the first computing device, sending a response to the second computing device that a telephony session is established between the first computing device and the second computing device;
   on the first computing device, sending a request message to register the first computing device for a data session at an online registry service, the request message to register including a telephone number associated with the first computing device and a telephone number associated with the second computing device, the telephone numbers associated with the first and second computing devices being utilized by the online registry service in an attempt to match the telephone numbers associated with the first and second computing devices with telephone numbers included in other request messages to register, received at the online registry service;

on the first computing device, receiving a response message indicating that the first computing device is registered at the online registry service, the response message including a key that uniquely identifies the data session; and on the first computing device, using the key to establish the data session with the second computing device.

2. The method of claim 1, wherein the first computing device is a client computer.

3. The method of claim 1, wherein the first computing device is a server computer.

4. The method of claim 1, wherein the second computing device is a mobile telephone or a server computer.

5. The method of claim 1, wherein sending the request message to register the first computing device for the data session at the online registry service further comprises including a first telephone number and a second telephone number in the request message, the first telephone number being a telephone number of the second computing device and the second telephone number being a telephone number of the first computing device.

6. The method of claim 5, wherein the first telephone number and the second telephone number are included as concatenated strings in the request message.

7. The method of claim 5, wherein the request message further includes a fully qualified domain name for the online registry service.

8. The method of claim 1, wherein the key comprises one or more numbers or alphabetic characters.

9. The method of claim 1, wherein using the key to establish the data session with the second computing device further comprises including the key in one or more data messages sent from the first computing device to the second computing device.

10. The method of claim 1, further comprising ending the telephony session with the second computing device and sending a message to the online registry service to end the data session.

11. A method implemented on a first computing device for establishing a multimodal telephone call, the method comprising:

on the first computing device, receiving a first request message from a second computing device to register a data session for the second computing device, the first request message including a first telephone number and a second telephone number;

on the first computing device, receiving a second request message to register the data session for a third computing device, the second request message including a third telephone number and a fourth telephone number;

on the first computing device, determining whether the first and second telephone numbers in the first request message match telephone numbers in other received request messages;

on the first computing device, when it is determined that the telephone numbers from the second computing device and the third computing device match, creating a key for the data session between the second computing device and the third computing device, the key providing a unique identifier for the data session.

12. The method of claim 11, further comprising on the first computing device, sending a first response message to the second computing device, the first response message including the key.

13. The method of claim 11, further comprising on the first computing device, sending a second response message to the third computing device, the second response message including the key.

14. The method of claim 11, wherein the first telephone number is a telephone number associated with the second computing device and the second telephone number is a telephone number associated with the third computing device.

15. The method of claim 11, wherein the third telephone number is a telephone number associated with the third computing device and the fourth telephone number is a telephone number associated with the second computing device.

16. The method of claim 11, wherein determining whether the telephone numbers from the second computing device and the third computing device match further comprises determining whether the first telephone number matches the fourth telephone number and determining whether the second telephone number matches the third telephone number.

17. The method of claim 11, further comprising receiving a message from the second computing device to invalidate the identifier.

18. The method of claim 17, further comprising receiving a message from the third computing device to invalidate the identifier.

19. The method of claim 18, further comprising unregistering the second computing device and the third computing device.

20. A computer-readable storage medium wherein the computer-readable storage medium does not include a transmission signal comprising instructions that, when executed by a client computer, cause the client computer to:

receive a telephone call from a second computing device;

send a response to the second computing device that a telephony session is established between the client computer and the second computing device;

send a first request message to register the client computer for a data session at an online registry service, the first request message to register including a first telephone number associated with the client computer and a second telephone number associated with the second computing device, the first and second telephone numbers being utilized by the online registry service in an attempt to match the first and second telephone numbers with telephone numbers received from other request messages to register, received at the online registry service;

receive a response message indicating that the client computer is registered at the online registry service, the response message including a key that uniquely identifies the data session; and initiate a second request message to send data to the second computing device, the second request message including the key.

* * * * *